May 30, 1950 P. J. H. JANSSEN 2,509,975

CIRCUIT FOR SEPARATION OF FRAME FROM LINE SYNCHRONIZING PULSES

Filed Jan. 31, 1947

P. J. H. JANSSEN
INVENTOR
BY Fred M Vogel
AGENT

Patented May 30, 1950 2,509,975

UNITED STATES PATENT OFFICE 2,509,975

CIRCUIT FOR SEPARATION OF FRAME FROM LINE SYNCHRONIZING PULSES

Peter Johannes Hubertus Janssen, Eindhoven, Netherlands, assignor to Hartford National Bank and Trust Company, Hartford, Conn., trustee Application January 31, 1947, Serial No. 725,450
In the Netherlands January 15, 1946

Section 1, Public Law 690, August 8, 1946
Patent expires January 15, 1966

6 Claims. (Cl. 178—7.3)

Figures 1A, 1B, 1C, 1D, 1E, 2, 3A, 3B, 3C:
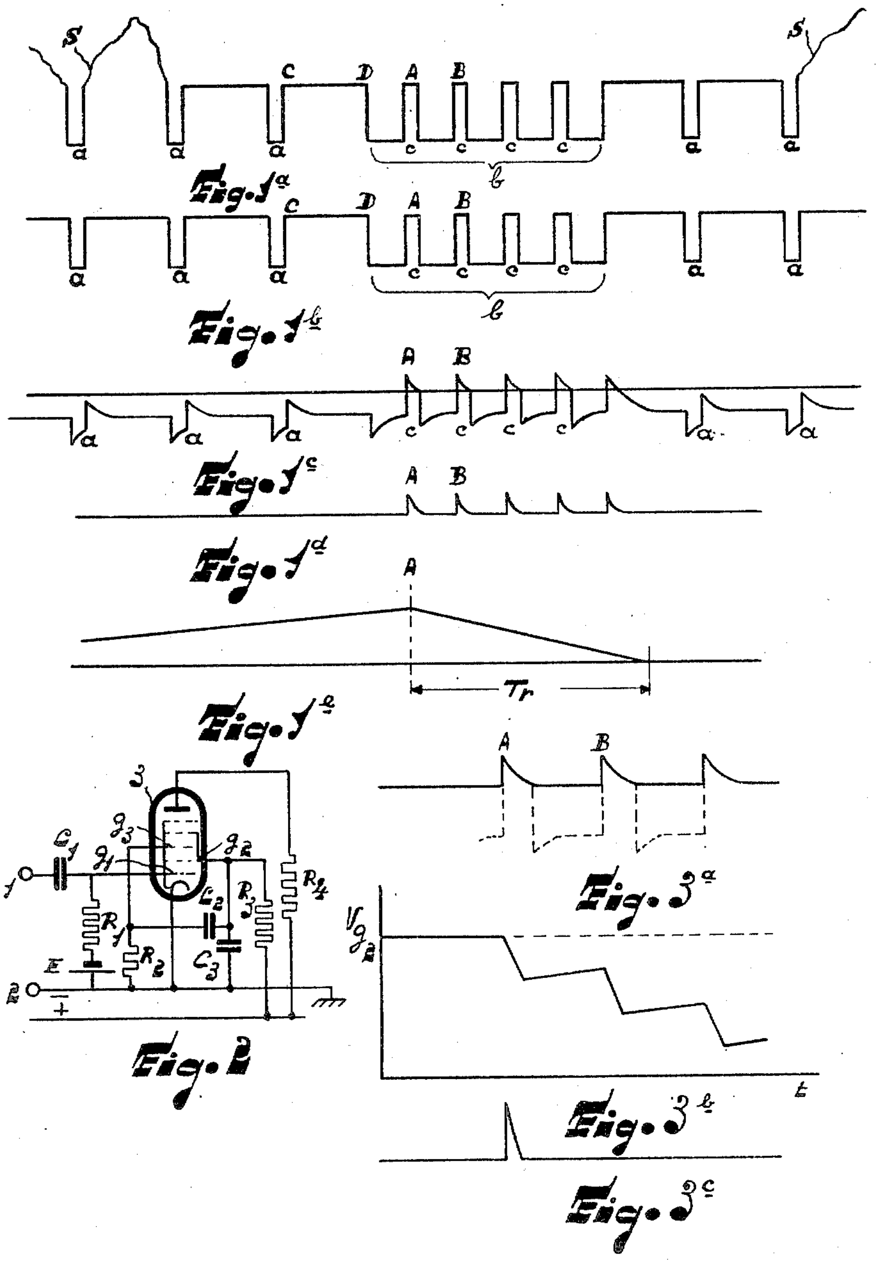

This invention relates to a method of synchronising the image saw-tooth generator in a receiver for animated or inanimated images; it furthermore relates to a circuit-arrangement for separating the image synchronisation pulses from the mixture of image and line-synchronisation pulses, which is suitable for carrying out this method.

On transmitting images it is known that line- and image-synchronisation pulses are transmitted together with the image currents S (Fig. 1*a*), the line synchronising pulses (*a*) occupying a short time and the image synchronising pulses (*b*) occupying a longer time. These pulses synchronise the line and image saw-tooth generator respectively in the receiver, which provides for the scanning of the image in a horizontal and vertical direction respectively. In order to cause the synchronisation of the line saw-tooth generator to last even during the occurrence of image synchronising pulses, the latter are interrupted by interruption pulses (*c*) which, in the case of interlaced scanning, have double the frequencies of the line synchronising pulses.

The synchronising pulses represented in Fig. 1*b* are separated, by means of a limiter, from the mixture of image currents and synchronising pulses. After that the image synchronising pulses are separated into line synchronising pulses and image synchronising pulses by means of a differentiating or integrating network which converts the initial pulses, which have equal amplitude, into pulses having different amplitudes. The latter, referred to hereinafter as derived pulses and represented in Fig. 1*c*, may be separated by means of an amplitude filter. It is common practice to use as an amplitude filter a discharge tube having a negative grid bias such that the grid voltage at which anode current tends to flow in the tube (threshold voltage) is exceeded only during the derived interruption pulses. Consequently, the derived line synchronising pulses *a* (Fig. 1*c*) remain below the threshold voltage represented by the line D—D, whereas the derived interruption pulses *c* in the image synchronising signal *b* exceed this voltage with their peaks A, B and so on, so that only they cause anode current to flow in the tube. These filtered pulses are used to control the image saw-tooth generator; they are represented in Fig. 1*d*.

The invention is based on the recognition that the fly-back time T*r*, in which the output voltage or output current of the image saw-tooth generator (shown in Fig. 1*e*) drops from its maximum value down to zero is influenced not only by the derived interruption pulse initiating the fly-back but also by the following pulses so that it is not exactly constant.

According to the invention care is therefore taken that only one of the interruption pulses of each image-synchronisation pulse influences the image saw-tooth generator.

For carrying out this method the invention provides furthermore a circuit-arrangement, which permits one of the derived interruption pulses to be separated, whereas the following interruption pulses are suppressed.

For this purpose the derived pulses control, if necessary through an amplitude filter, the current to an electrode of a discharge tube having a positive potential in a manner such that it is able to flow only if the amplitude of the derived interruption pulses exceeds that of the derived line-synchronisation pulses, due to which a stepwise variable voltage is set up across an impedance connected to this electrode. This voltage is mixed with the derived pulses, if desired after traversing the amplitude filter, in the same or in another discharge tube which is adjusted in a manner such that in the output circuit thereof a current is able to flow only during one of the interruption pulses.

In order that the invention may be clearly understood and readily carried into effect, it will now be described more fully with reference to the accompanying drawing, in which Fig. 2 represents a circuit-arrangement according to the invention, whereas Fig. 3 shows a voltage variation *a* at the first grid of the electron discharge tube (full and dotted curve), *b* of the electrode, the circuit of which includes the said network, *c* of the finally transmitted pulse respectively.

In the circuit-arrangement shown in Fig. 2 the mixture of line- and image-synchronisation pulses (Fig. 1*b*) is supplied to the terminals 1, 2. This mixture traverses the differentiating network $C_1$—$R_1$, a source of direct voltage E being connected in series with the resistance $R_1$. Consequently a voltage as shown in Fig. 1*c* is set up between the grid $g_1$ and the cathode of the electron discharge tube 5. Owing to the negative bias of grid $g_1$ determined by the source of direct voltage E, which functions as a threshold voltage, a current flows in the tube only during the appearance of the derived interruption pulses (A, B and so on of Fig. 1*c*). This current is indicated by a full line in Fig. 3*a*.

The following occurs: at the first pulse A current flows in the anode circuit of the tube, owing to which a pulse-shaped voltage drop occurs through the resistance $R_4$ in this circuit. At the same time current flows in the circuit comprising screen-grid $g_2$ next to the control-grid $g_1$, owing to which a drop of voltage likewise appears across resistance $R_3$ of this circuit. $R_3$ is shunted by a small condenser $C_3$. The time constant of the network $R_3$—$C_3$ is such that, owing to pulse A, the current flowing in the circuit comprising screen-grid $g_2$ in the tube rapidly discharges the small condenser $C_3$ which is slowly charged through the high resistance $R_3$ when the tube ceases to pass current at the end of the pulse. The voltage $Vg_2$ at the grid $g_2$ then varies as a function of time $t$, as is shown in Fig. 3*b*. Upon each interruption pulse the voltage $Vg_2$ drops stepwise.

The grid $g_2$ is coupled, through a network $C_2R_2$, with a second control-grid $g_3$ of tube 3. This network has such a high time constant that the voltage at this grid exhibits the same variation (Fig. 3*b*) as that of grid $g_2$. In this case, the negative voltage of grid $g_3$, after the first interruption pulse A, is sufficient to suppress any further stream of electrons to the anode. Therefore, the anode current of the tube is able to flow only during the first interruption pulse and yields a pulse-like voltage drop across $R_4$. This pulse voltage is supplied to the image saw-tooth generator, the synchronisation of which is consequently influenced only by the pulse occurring at the moment A.

It is obvious that, if one terminal of condenser $C_3$ is connected to the high-voltage side, instead of being connected to the low voltage side of the supply, the effect remains the same on the understanding that the condenser is charged in a short time and discharged in a longer time.

Instead of using the circuit-arrangement shown in Fig. 2, which comprises a single tube and two control-grids, the circuit may also comprise an electron discharge tube having one control grid and the voltage set up across resistance $R_2$ (Fig. 3*b*) in series with the voltage set up at grid $g_1$ (Fig. 3*a*) may be supplied to the grid of a second electron discharge tube, the anode current of which, in the case of a suitable adjustment, will then exhibit again a variation corresponding to Fig. 3*c*.

In the circuit-arrangement shown in Fig. 2, tube 3 functions at the same time as an amplitude filter which passes only the filtered pulses (Fig. 1*d*) of the derived pulses (Fig. 1*c*), which is achieved by correct adjustment of the negative grid bias of grid $g_1$ by means of the supply E. As an alternative a separate amplitude filter may be connected between the network $C_1R_1$ and tube 3 in such manner that the filtered pulses (Fig. 1*d*) are supplied to grid $g_1$ only.

It has been supposed that synchronisation of the image saw-tooth generator is effected by the first interruption pulse A (Fig. 1*c*). However, the choice of a different time constant of the network $C_1R_1$ permits the amplitude of the derived interruption pulses to be given a sufficient value only at the second interruption pulse or at a still later interruption pulse to exceed the threshold value determined by line D—D in Fig. 1*c*, so that synchronisation of the image saw-tooth generator occurs at the second or at a subsequent interruption pulse.

What I claim is:

1. An image synchronizing system adapted to be energized by a composite signal including line synchronizing signals and a plurality of cyclically recurring image synchronizing signals of the same polarity as said line synchronizing signals, comprising means to derive from said line synchronizing signals a first set of pulses and from said image synchronizing signals a second set of pulses having an amplitude greater than said first pulses, vacuum tube translating means comprising a first transmission path and a second transmission path arranged in series relationship, means to apply a threshold potential to said first path and make the same conductive solely to pulses of said second set, and means responsive to said second set of pulses coupled to the output of said first path and to said second path to make the said second path conductive solely to a desired number of pulses of said second set.

2. An image synchronizing system adapted to be energized by a composite signal including line synchronizing signals and a plurality of cyclically recurring image synchronizing signals of the same polarity as said line synchronizing signals, comprising means to derive from said line synchronizing signals a first set of pulses and from said image synchronizing signals a second set of pulses having an amplitude greater than said first pulses, vacuum tube translating means comprising a first transmission path and a second transmission path connected in series relationship, means to apply a first negative potential to said first path and make the same conductive solely to pulses of said second set, means coupled to the output of said first path to produce a second negative potential having an amplitude proportional to the number of pulses of said second set transmitted through said first path, and means to apply said second negative potential to said second path to make the same conductive solely to the first of the pulses of said second set.

3. An image synchronizing system adapted to be energized by a composite signal including line synchronizing signals and a plurality of cyclically recurring image synchronizing signals of the same polarity as said line synchronizing signals, comprising means to derive from said line synchronizing signals a first set of pulses and from said image synchronizing signals a second set of pulses having an amplitude greater than said first pulses, vacuum tube translating means comprising a first transmission path having a first control electrode and a second transmission path having a second control electrode, said paths being arranged in series relationship, means to apply a first negative potential to said first control electrode to make said first path conductive solely to pulses of said second set, means coupled to the output of said first path to produce a second negative potential having an amplitude proportional to the number of pulses of said second path transmitted through said first path, and means to apply said second negative potential to said second control electrode to make said second path conductive solely to the first of the pulses of said second set.

4. An image synchronizing system adapted to be energized by a composite signal including line synchronizing signals and a plurality of cyclically recurring image synchronizing signals of the same polarity as said line synchronizing signals, comprising an electron discharge tube having in the order named a cathode, a first control grid, a screen grid, a second control grid and an anode, means to derive from said line synchronizing signals a first set of pulses and from said image synchronizing signals a second set of pulses having an amplitude greater than said first pulses, means to apply said first and second set of pulses to said first control grid, means to apply a first negative potential to said first control grid to open the cathode-screen grid path of said tube solely to pulses of said second set, means coupled to the screen grid to produce a second negative potential having an amplitude proportional to the number of pulses of said second set applied to said first control grid, and means to apply said second negative potential to said second control grid to open the cathode-anode path of said tube solely to the first of the pulses of said second set.

5. An image synchronizing system adapted to be energized by a composite signal including line synchronizing signals and a plurality of cyclically recurring image synchronizing signals of the same polarity as said line synchronizing signals, comprising an input circuit, an electron discharge tube having in the order named, a cathode, a first control grid, a screen grid, a second control grid and an anode, means comprising a capacitor and a resistor connected in series across said input circuit to derive from said line synchronizing signals a first set of pulses and from said image synchronizing signals a second set of pulses having an amplitude greater than said first pulses, means to apply said pulses to said first control grid, means to apply a first negative potential to said first control grid to open the cathode-screen grid path of said tube solely to pulses of said second set, means to produce a second negative potential having an amplitude proportional to the number of pulses of said second set applied to said first control grid comprising a second resistor and a second capacitor coupled to said screen grid, said second capacitor and the cathode-screen grid path of said discharge tube having a discharge time constant shorter than said image synchronizing signals, said second capacitor and said second resistor having a charging time constant longer than said image synchronizing signals, and means to apply said second negative potential to said second control grid to open the cathode-anode path of said tube solely to the first of the pulses of said second set.

6. A television synchronizing system adapted to be energized by a composite signal including line synchronizing signals and a plurality of cyclically recurring image synchronizing signals of the same polarity as said line synchronizing signals, comprising an electron discharge tube having in the order named a cathode, a first control grid, a screen grid, a second control grid and an anode, a pair of input terminals, one of said input terminals and the cathode of said tube being at a point of fixed potential, a capacitor and a resistor connected in series across said input terminals to derive from said line synchronizing signals a first set of pulses and from said image synchronizing signals a second set of pulses having an amplitude greater than said first pulses, means to couple said first control grid to the junction of said capacitor and said resistor, a source of negative biasing potential connected through said first resistor to said first control grid to open the cathode-screen grid path of said tube solely to pulses of said second set, means comprising a screen grid resistor to apply an operating potential to said screen grid and to develop a screen grid output potential, a second capacitor connected between said screen grid and said point of fixed potential, said second capacitor and the cathode-screen grid path of said tube having a discharge time constant shorter than said image synchronizing signals, said second capacitor and said screen grid resistor having a charging time constant longer than said image synchronizing signals, a third capacitor coupling said screen grid to said second control grid to apply said screen grid output potential in opposite phase thereto, a grid-leak coupling said second control grid to said point of fixed potential, said third capacitor and said grid-leak resistor having a time constant at which the voltage of said second control grid varies substantially in accordance with the voltage on said screen grid, means comprising an anode load resistor to apply operating potential to said anode and to develop an image synchronizing output potential.

PETER JOHANNES HUBERTUS JANSSEN.

REFERENCES CITED

The following references are of record in the file of this patent:

UNITED STATES PATENTS

| Number | Name | Date |
|---|---|---|
| Re. 22,390 | Lewis | Nov. 9, 1943 |
| 2,141,343 | Campbell | Dec. 27, 1938 |
| 2,211,942 | White | Aug. 20, 1940 |
| 2,265,996 | Blumlein | Dec. 16, 1941 |
| 2,399,135 | Miller | Apr. 23, 1946 |